US008024456B2

(12) United States Patent  
Adelman et al.

(10) Patent No.: US 8,024,456 B2  
(45) Date of Patent: Sep. 20, 2011

(54) INTERACTIVE DNS FOR CONTROLLING PARTY

(75) Inventors: Warren Adelman, Scottsdale, AZ (US); Nathan Curran, Phoenix, AZ (US); Justin Jilg, Mesa, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 100 days.

(21) Appl. No.: 12/051,712

(22) Filed: Mar. 19, 2008

(65) Prior Publication Data

US 2009/0240799 A1   Sep. 24, 2009

(51) Int. Cl.  
*G06F 15/16* (2006.01)

(52) U.S. Cl. .......................... 709/224; 709/219; 709/245

(58) Field of Classification Search ................. 709/245, 709/223, 220, 203, 224, 219; 707/1, 5, 999.1; 726/4  
See application file for complete search history.

(56) References Cited

U.S. PATENT DOCUMENTS

| | | | |
|---|---|---|---|
| 7,191,210 B2 * | 3/2007 | Grossman ..................... 709/203 |
| 7,552,466 B2 * | 6/2009 | Rosenberg et al. ............... 726/4 |
| 2002/0026439 A1 | 2/2002 | Monroe | |
| 2004/0162916 A1 * | 8/2004 | Ryan ............................. 709/245 |
| 2004/0199608 A1 * | 10/2004 | Rechterman et al. ......... 709/220 |
| 2005/0114484 A1 * | 5/2005 | Wilson et al. .................. 709/223 |
| 2006/0026114 A1 * | 2/2006 | Gregoire et al. .................. 707/1 |
| 2007/0214284 A1 * | 9/2007 | King et al. ..................... 709/245 |
| 2009/0063451 A1 * | 3/2009 | Bennett ............................ 707/5 |

OTHER PUBLICATIONS

Mockapetris, RFC1035, Domain Names—Implementation and Specification, Nov. 1987.  
Rosenbaum, RFC1464, Using the Domain Name System to Store Arbitrary String Attributes, May 1993.  
Network Solutions Launches Enhanced Business Listings, Press Release. Nov. 26, 2007.  
Final task force report on the purpose of Whois and of the Whois contacts. ICANN Webpage. Mar. 15, 2006.

* cited by examiner

*Primary Examiner* — Jungwon Chang  
(74) *Attorney, Agent, or Firm* — Sergey G. Zaytsev (57) ABSTRACT

A Hosting Entity or another entity may provide a framework for collecting DNS Business Information from a Controlling Party of a domain name and entering it into DNS. The framework may include a website, webpage, web service, web resource, software, API, or another technological solution suitable for collecting DNS Business Information from Controlling Party. The website, webpage, web service, or the web resource may be located at URL associated with a Controlling Party's domain name, e.g. an active or a parked page for the domain name. DNS Business Information will be typically available for viewing to everyone along with the traditional DNS information.

13 Claims, 7 Drawing Sheets

```
Registrant:
GoDaddy.com, Inc.

14455 N Hayden Rd #226
Scottsdale, Arizona 85260
United States

Registered through: GoDaddy.com, Inc. (http://www.godaddy.com)
Domain Name: GODADDY.COM
Created on: 02-Mar-99
Expires on: 02-Mar-16
Last Updated on: 24-Jan-07

Administrative Contact:
GoDaddy.com, Inc., GoDaddy.com, Inc. dns@jomax.net
GoDaddy.com, Inc.
14455 N Hayden Rd #226
Scottsdale, Arizona 85260
United States
4805058800 Fax -- 4805058844

Technical Contact:
GoDaddy.com, Inc., GoDaddy.com, Inc. dns@jomax.net
GoDaddy.com, Inc.
14455 N Hayden Rd #226
Scottsdale, Arizona 85260
United States
4805058800 Fax -- 4805058844

Domain servers in listed order:
CNS1.SECURESERVER.NET
CNS2.SECURESERVER.NET
CNS3.SECURESERVER.NET Registry Status: clientDeleteProhibited
Registry Status: clientRenewProhibited
Registry Status: clientTransferProhibited
Registry Status: clientUpdateProhibited
```

FIG. 1 (prior art)

```
$TTL   86400

@         IN    SOA    ns1.sample-dns-server.com. info.example.com. (
                       2008021501    ; YYYYMMDDnn, where 'nn' is the revision
                       10800         ; Refresh
                       3600          ; Retry
                       604800        ; Expire
                       3600)         ; Minimum example.com.                    IN NS      ns1.sample-dns-server.com.
example.com.                    IN NS      ns2.sample-dns-server.com.
ns1.sample-dns-server.com.      IN A       68.178.12.176
ns2.sample-dns-server.com.      IN A       68.178.12.121
webmail.example.com.            IN A       68.178.12.176
mssql.example.com.              IN A       68.178.12.176
sitebuilder.example.com.        IN A       68.178.12.176
mail.example.com.               IN A       68.178.12.176
example.com.                    IN A       68.178.12.176
ftp.example.com.                IN CNAME   example.com.
www.example.com.                IN CNAME   example.com.
example.com.                    IN MX      10 mail.example.com.
```

```
Registrant:
GoDaddy.com, Inc.

14455 N Hayden Rd #226
Scottsdale, Arizona 85260
United States

Registered through: GoDaddy.com, Inc. (http://www.godaddy.com)
Domain Name: GODADDY.COM
Created on: 02-Mar-99
Expires on: 02-Mar-16
Last Updated on: 24-Jan-07

Administrative Contact:
GoDaddy.com, Inc., GoDaddy.com, Inc. dns@jomax.net
GoDaddy.com, Inc.
14455 N Hayden Rd #226
Scottsdale, Arizona 85260
United States
4805058800 Fax -- 4805058844

Technical Contact:
GoDaddy.com, Inc., GoDaddy.com, Inc. dns@jomax.net
GoDaddy.com, Inc.
14455 N Hayden Rd #226
Scottsdale, Arizona 85260
United States
4805058800 Fax -- 4805058844

Domain servers in listed order:
CNS1.SECURESERVER.NET
CNS2.SECURESERVER.NET
CNS3.SECURESERVER.NET Registry Status: clientDeleteProhibited
Registry Status: clientRenewProhibited
Registry Status: clientTransferProhibited
Registry Status: clientUpdateProhibited
```

1005 —  Comments:
          1: How much is this domain name?
          2: This domain name is not for sale.

1010 —  Products for sale:
          1: Domain Names - https://www.godaddy.com/gdshop/registrar/search.asp
          2: Hosting - https://www.godaddy.com/gdshop/hosting/landing.asp

FIG. 10

```
$TTL   86400

@       IN    SOA    ns1.sample-dns-server.com. info.example.com. (
                     2008021501    ; YYYYMMDDnn, where 'nn' is the revision
                     10800         ; Refresh
                     3600          ; Retry
                     604800        ; Expire
                     3600)         ; Minimum example.com.                IN  NS      ns1.sample-dns-server.com.
        example.com.                IN  NS      ns2.sample-dns-server.com.
        ns1.sample-dns-server.com.  IN  A       68.178.12.176
        ns2.sample-dns-server.com.  IN  A       68.178.12.121
        webmail.example.com.        IN  A       68.178.12.176
        mssql.example.com.          IN  A       68.178.12.176
        sitebuilder.example.com.    IN  A       68.178.12.176
        mail.example.com.           IN  A       68.178.12.176
        example.com.                IN  A       68.178.12.176
        ftp.example.com.            IN  CNAME   example.com.
        www.example.com.            IN  CNAME   example.com.
        example.com.                IN  MX      10 mail.example.com.
1105 ─╱ example.com.                IN  TXT     This Domain is for sale.
                                                Price: $350.
1110 ─╱ example.com.                IN  TXT     Hours of Operation: Mon-Fri,
                                                9 a.m. - 5 p.m.
1115 ─╱ example.com.                IN  TXT     Third party comment: Who
                                                should I contact about the
                                                purchase of this domain?
```

FIG. 11

INTERACTIVE DNS FOR CONTROLLING PARTY

CROSS REFERENCE TO RELATED PATENT APPLICATION

This patent application is related to U.S. patent application Ser. No. 12/051,665, "INTERACTIVE WHOIS" concurrently filed herewith and also assigned to The Go Daddy Group, Inc.

This patent application is related to U.S. patent application Ser. No. 12/051,718, "INTERACTIVE DNS FOR NON-CONTROLLING PARTY" concurrently filed herewith and also assigned to The Go Daddy Group, Inc.

FIELD OF THE INVENTION

The present invention relates to new systems and methods for the extension of DNS functionality.

BACKGROUND OF THE INVENTION

The Internet comprises a vast number of computers and computer networks that are interconnected through communication links. The interconnected computers exchange information using various services, such as electronic mail and the World Wide Web (WWW). The WWW service allows a server computer system (i.e., web server or website) to send textual and graphical webpages of information to a remote client computer system. The remote client computer system can then display the webpages. Each resource (e.g., computer or webpage) of the WWW is uniquely identifiable by a Uniform Resource Locator (URL). To view a specific webpage, a client computer system specifies the URL for the webpage in a request (e.g., a HyperText Transfer Protocol (HTTP) request). These follow the familiar format http://www.example.com uniquely identifying the particular resource. The request is forwarded to the web server that serves the webpage to the client computer system. When the client computer system receives the webpage, it typically displays the webpage using a browser. A browser is a special-purpose application program that requests and displays the webpages.

Figure 1:
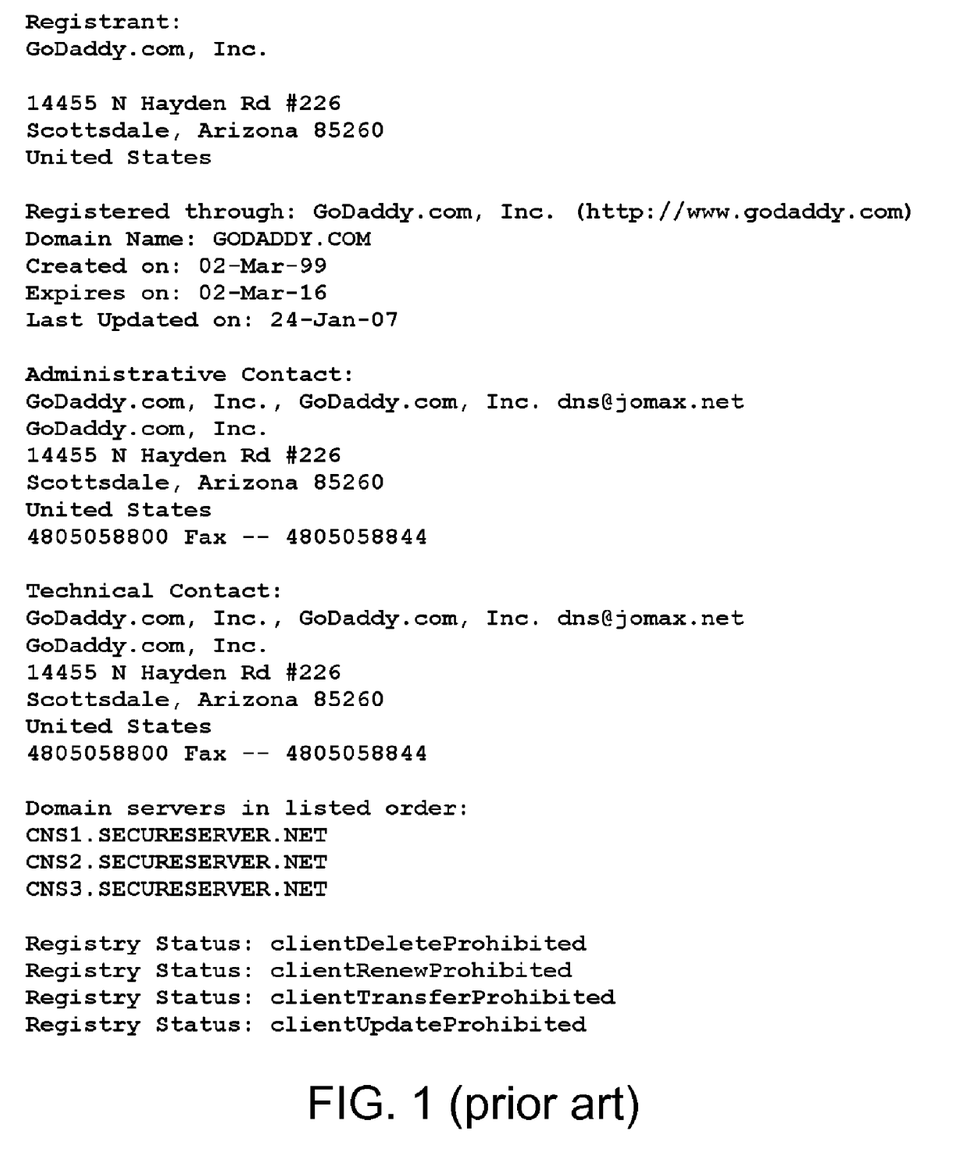
FIG. 1 is a sample prior art printout of WHOIS data.

WHOIS is a TCP-based (Transmission Control Protocol) transaction-oriented query/response protocol that is used to provide information services to Internet users. While originally used to provide "white pages" services and information about registered domain names, current deployments cover a much broader range of information services. The protocol delivers its content in a human-readable format. A sample WHOIS printout is shown in FIG. 1.

A WHOIS server listens on TCP port 43 for requests from WHOIS clients. The WHOIS client makes a text request to the WHOIS server, then the WHOIS server replies with text content. All requests are terminated with ASCII CR and then ASCII LF. The response might contain more than one line of text, so the presence of ASCII CR or ASCII LF characters does not indicate the end of the response. The WHOIS server closes its connection as soon as the output is finished. The closed TCP connection is the indication to the client that the response has been received.

For historical reasons, WHOIS lacks many of the modern protocol design attributes, for example internationalization and strong security. The WHOIS protocol has no mechanism for indicating the character set in use. Originally, the predominant text encoding in use was US-ASCII. In practice, some WHOIS servers, particularly those outside the USA, might be using some other character set either for requests, replies, or both. This inability to predict or express text encoding has adversely impacted the interoperability (and, therefore, usefulness) of the WHOIS protocol.

The WHOIS protocol has no provisions for strong security. WHOIS lacks mechanisms for access control, integrity, and confidentiality. Accordingly, WHOIS-based services are used for information which is non-sensitive and intended to be accessible to everyone.

The domain name system (DNS) is the world's largest distributed computing system that enables access to any resource in the Internet by translating user-friendly domain names to IP Addresses. The process of translating domain names to IP Addresses is called Name Resolution. A DNS name resolution is the first step in the majority of Internet transactions. The DNS is in fact a client-server system that provides this name resolution service through a family of servers called Domain Name Servers. The hierarchical domain space is divided into administrative units called zones. A zone usually consists of a domain (say example.com) and possibly one or more sub domains (projects.example.com, services.example.com). The authoritative data needed for performing the name resolution service is contained in a file called the zone file and the DNS servers hosting this file are called the authoritative name servers for that zone. The DNS clients that make use of the services provided by authoritative name servers may be of two types. One type is called a stub resolver that formulates and sends a query every time it receives a request from an application that requires Internet service (e.g., a browser). The other type is called a caching (also called recursive/resolving) name server that caches the name resolution responses it has obtained from the authoritative name servers and is thus able to serve multiple stub resolvers.

Figure 2:
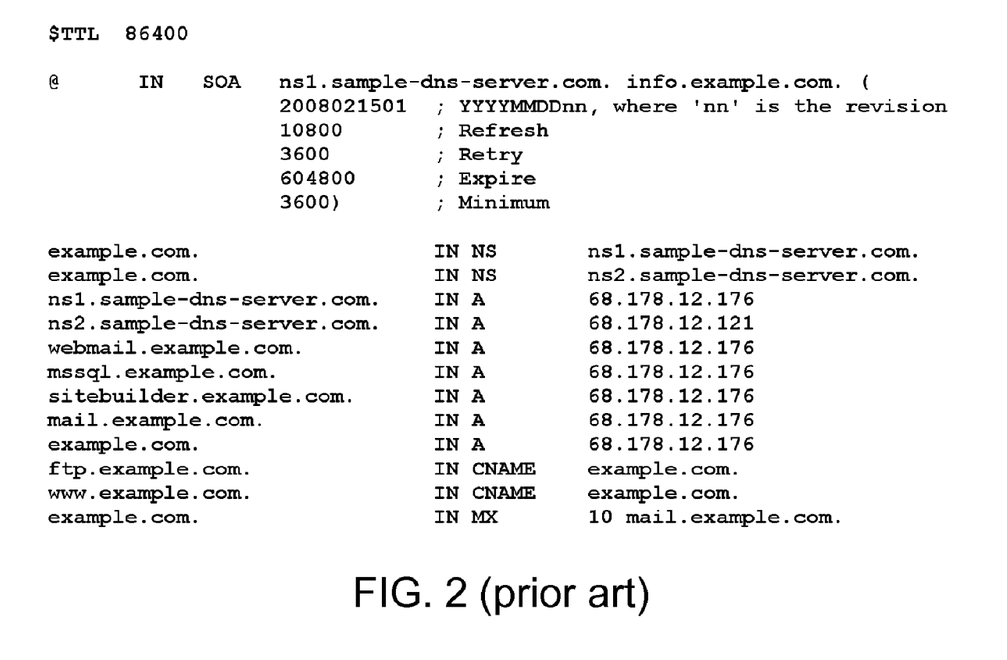
FIG. 2 is a sample prior art printout of DNS zone file data.

The zone file hosted on an authoritative name server consists of various types of records called Resource Records (RRs). A type (RRtype) is associated with each DNS resource record. The code for these RRtypes is assigned by an international organization called Internet Assigned Names Authority (IANA). An RR of a given RRtype in a zone file provides a specific type of information. Some of the common RRtype codes are: NS, MX, CNAME, and A. An NS RR in a zone file gives the fully qualified domain name (FQDN) of the host that is considered the name server for that zone. For example, an NS RR in the zone file of the zone example.com may give the information that the host ns1.projects.example.com is a name server for the domain projects.example.com. Similarly an MX RR gives the host name for a mail server for the zone. An A RR gives the IP address for a host in a domain within the zone. CNAME provides "canonical name" records and mapping of names in the zone file. A zone file generally consists of multiple RRs of a given RRtype with some exceptions (e.g., there can be only SOA RR in a zone file). It can also have multiple RRs for the same domain name and same (or different) RRtype (e.g., multiple name servers or mail servers for a domain services.example.com). A sample DNS zone file printout is shown in FIG. 2.

The DNS infrastructure consists of many different types of DNS servers, DNS clients, and transactions between these entities. The most important transaction in DNS is the one that provides the core service of DNS (i.e., name resolution service) and is called the DNS Query/Response. A DNS Query/Response transaction is made up of a query originating from a DNS client (generically called a DNS resolver) and response from a DNS name server. The response consists of one or more RRs. These RRs may be served from its own zone file (for an authoritative name server) or from a cache of RRs obtained from other name servers (for a caching/resolving/recursive name servers). In this way, the DNS serves as a global, distributed database. Name servers (serving zone files) each contain a small portion of the global domain space, and clients issue queries using a domain name and a desired RRtype.

DETAILED DESCRIPTION

Figure 3:
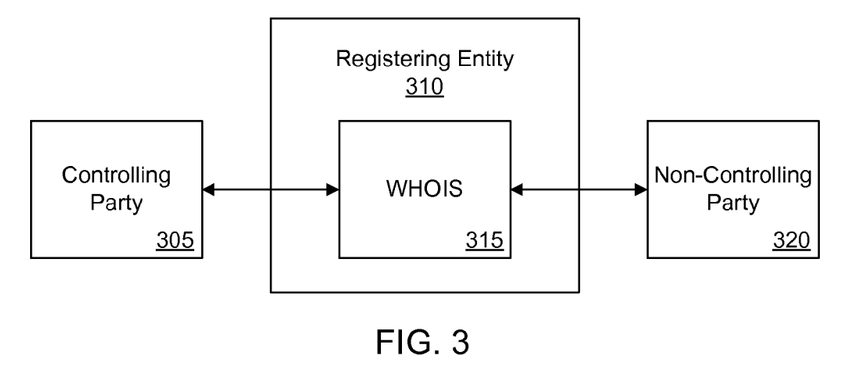
FIG. 3 is a block diagram illustrating a sample embodiment of a system of the present invention using WHOIS.

Referring to FIG. 3, a Controlling Party 305 and a Non-Controlling Party 320 may have a read-only or read-and-write access to the WHOIS records 315 for reading or entering a WHOIS Business Information. The Controlling Party 305 is an individual, an organization, or another entity that has control over a domain name and subsequently the WHOIS records 315 for the domain name. The Controlling Party 305 is typically an owner, a Registrant, an administrator, or a record holder for the domain name, or an entity otherwise responsible for maintaining the domain name. The Non-Controlling Party 320 is an individual, an organization, or another entity that does not have control over the domain name and the WHOIS records 315. The WHOIS records 315 are maintained by a Registering Entity 310, such as a Registry, a Registrar, or a Reseller of a Registry or a Registrar.

The WHOIS Business Information is information currently not present in the WHOIS records. The WHOIS Business Information does not include information used for technical operation of the domain name, resolution of the domain name through domain servers, registry status of the domain name, reputation information, nor Registrant's, administrative, technical, and/or billing contact information. The WHOIS Business Information may include comments posted by the Controlling Party 305 and the Non-Controlling Party 320 (see 1005 in FIG. 10), products for sale (see 1010 in FIG. 10), or any other information, discussion, etc. not currently saved in the WHOIS.

Figure 6:
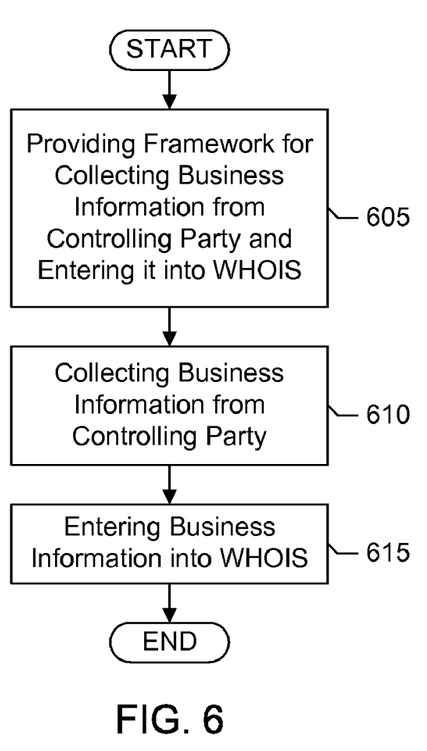
FIG. 6 is a flowchart showing a sample embodiment of a process for collecting Business Information from Controlling Party and entering it into WHOIS.

Referring to FIG. 6, the Registering Entity 310 or another entity may provide a framework for collecting the WHOIS Business Information from the Controlling Party 305 and entering it into the WHOIS (step 605). The framework may include a website, a webpage, a web service, a web resource, a software, an API (application programming interface), or another technological solution suitable for collecting the WHOIS Business Information from the Controlling Party 305. The website, webpage, web service, or the web resource may be located at a URL associated with the Controlling Party's domain name, at a URL associated with the Registering Entity 310, at a URL showing WHOIS information for the domain name, at a URL showing DNS information for the domain name, at a URL showing business registration information for the domain name, etc. The webpage may be a static page, a dynamic page, an active page, or a parked page for the domain name. The framework does not include control panels that are used for entering traditional information into the WHOIS. The WHOIS Business Information may be collected from the Controlling Party 305 (step 610) and entered into the WHOIS (step 615). The WHOIS Business Information will be typically available for viewing to everyone along with the traditional WHOIS information.

Figure 7:
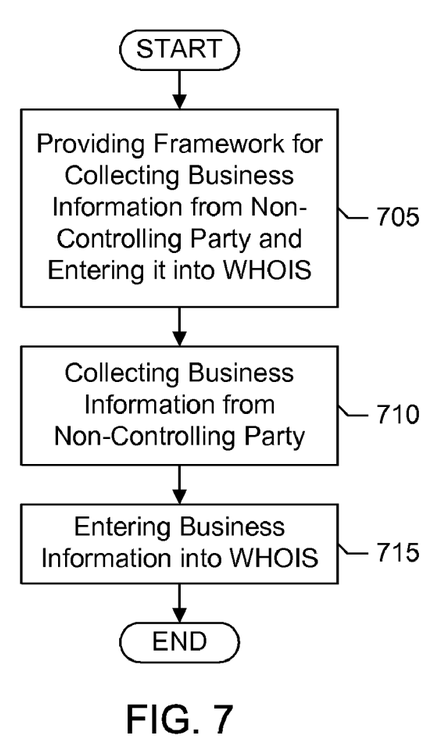
FIG. 7 is a flowchart showing a sample embodiment of a process for collecting Business Information from Non-Controlling Party and entering it into WHOIS.

Referring to FIG. 7, the Registering Entity 310 or another entity may provide a framework for collecting the WHOIS Business Information from the Non-Controlling Party 320 and entering it into the WHOIS (step 705). The framework may include a website, a webpage, a web service, a web resource, a software, an API (application programming interface), or another technological solution suitable for collecting the WHOIS Business Information from the Non-Controlling Party 320. The website, webpage, web service, or the web resource may be located at a URL associated with the Controlling Party's domain name, at a URL associated with the Registering Entity 310, at a URL showing WHOIS information for the domain name, at a URL showing DNS information for the domain name, at a URL showing business registration information for the domain name, etc. The webpage may be a static page, a dynamic page, an active page, or a parked page for the domain name. The framework does not include control panels that are used for entering traditional information into the WHOIS. The WHOIS Business Information may be collected from the Non-Controlling Party 320 (step 710) and entered into the WHOIS (step 715). The WHOIS Business Information will be typically available for viewing to everyone along with the traditional WHOIS information.

Figure 10:
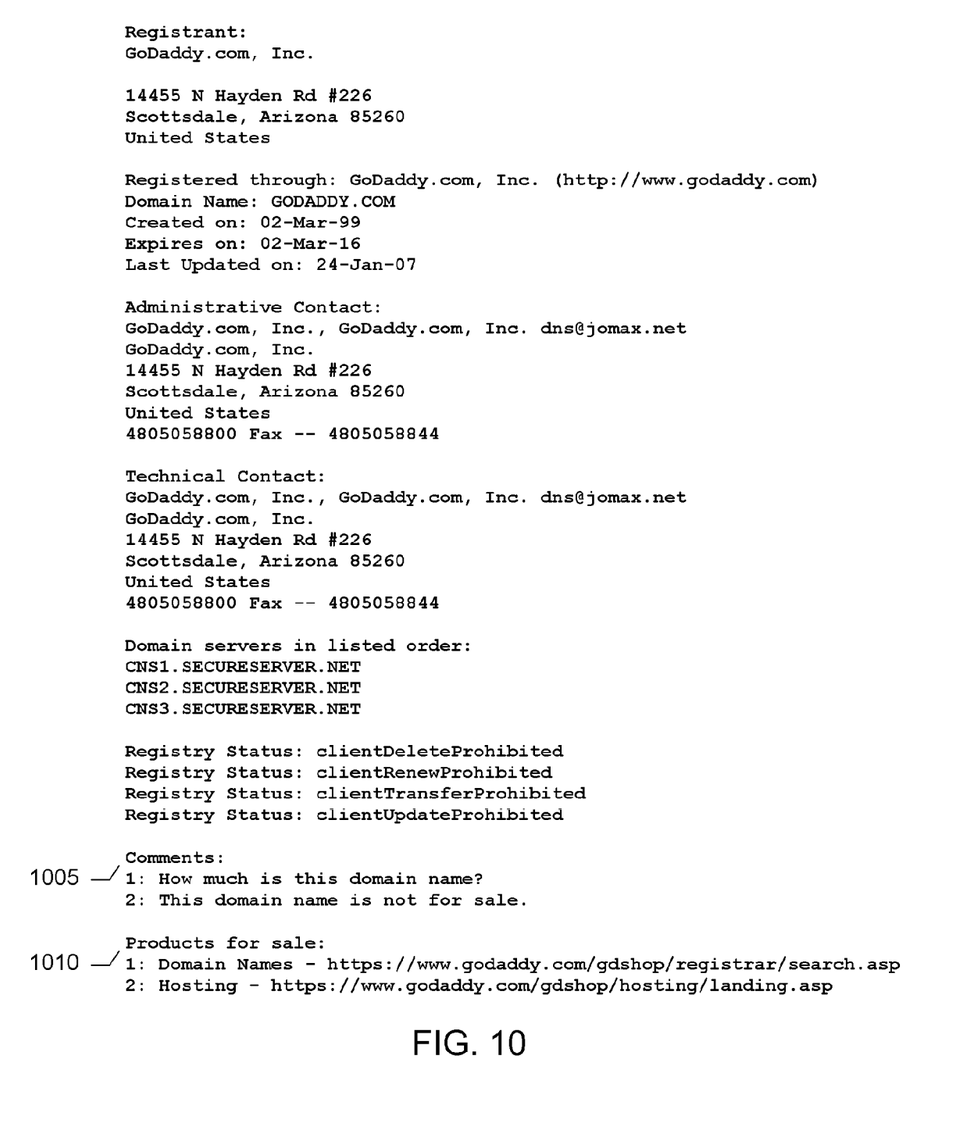
FIG. 10 is a sample printout of WHOIS data with Business Information.

For example, the Non-Controlling Party 320 may ask "How much is this domain name?" and the Controlling Party 305 may reply "This domain is not for sale." (See 1005 in FIG. 10). The WHOIS Business Information may be saved in the WHOIS as text, as character-separated (delimited) text, as fixed width columns text, as markup language formatted text, or in any other form. The markup language formatted text may include HTML, XML, or any other markup language. The Registering Entity 310 may impose further limitations on which tags can be used in the markup language; e.g. scripts can be prohibited. Additionally a link, an image, a banner, or any other multimedia information may be saved into the WHOIS. Involved parties may also participate in a link exchange and/or a banner exchange.

Figure 4:
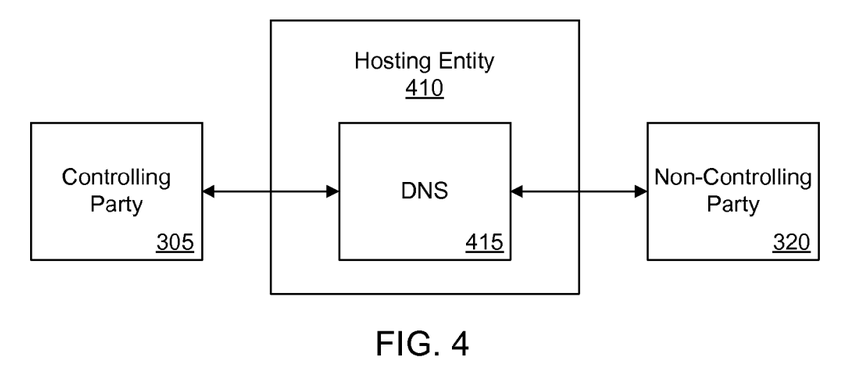
FIG. 4 is a block diagram illustrating a sample embodiment of a system of the present invention using DNS.

Referring to FIG. 4, a Controlling Party 305 and a Non-Controlling Party 320 may have a read-only or read-and-write access to the DNS records 415 for reading or entering a DNS Business Information. The Controlling Party 305 is an individual, an organization, or another entity that has control over a domain name and subsequently the DNS records 415 for the domain name. The Controlling Party 305 is typically an owner, a Registrant, an administrator, or a record holder for the domain name or a website associated with the domain name, or an entity otherwise responsible for maintaining the domain name or the website. The Non-Controlling Party 320 is an individual, an organization, or another entity that does not have control over the domain name and the DNS records 415. The DNS records 415 are maintained by a Hosting Entity 410, such as a Registry, a Registrar, a Hosting Company, or a Reseller of a Registry, a Registrar, or a Hosting Company. The Hosting Entity 410 typically hosts a website, a webpage, an email address, a DNS record, or another network related service, resource, or document (or plurality thereof) associated with the domain name.

Figure 11:
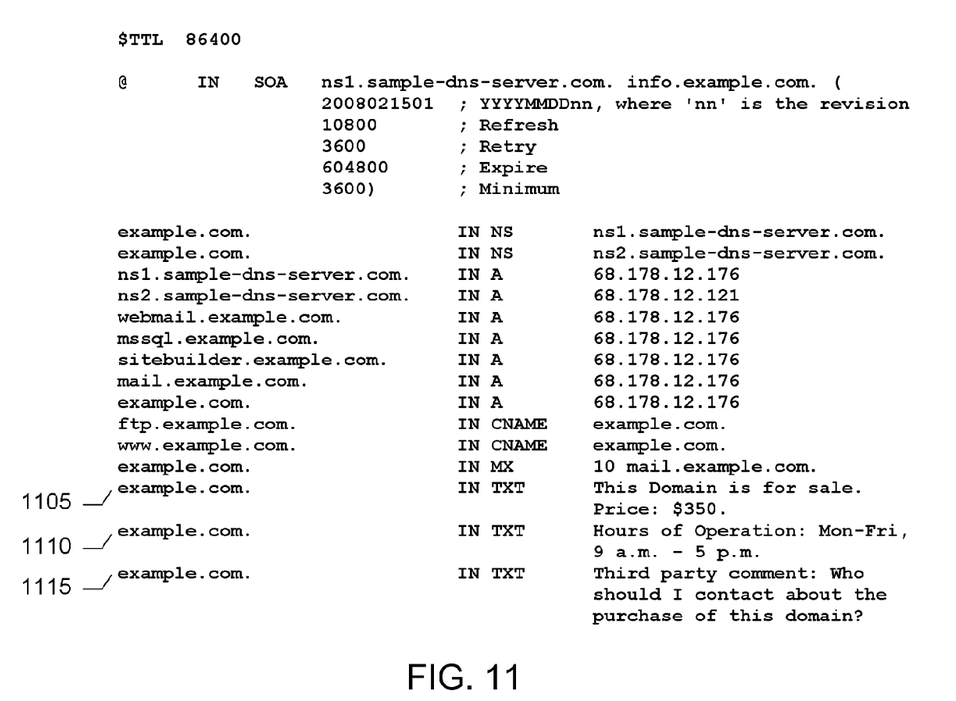
FIG. 11 is a sample printout of DNS zone file data with Business Information.

The DNS Business Information is information currently not present in the DNS records. The DNS Business Information does not include information used for technical operation of the domain name, resolution of the domain name through domain servers, nor reputation information. The DNS Business Information may include information about the business, hours of operation (see 1110 in FIG. 11), maps and directions, products for sale, comments posted by the Controlling Party 305 and the Non-Controlling Party 320 (see 1105 and 1115 in FIG. 11), or any other information, discussion, etc. not currently saved in the DNS.

Figure 8:
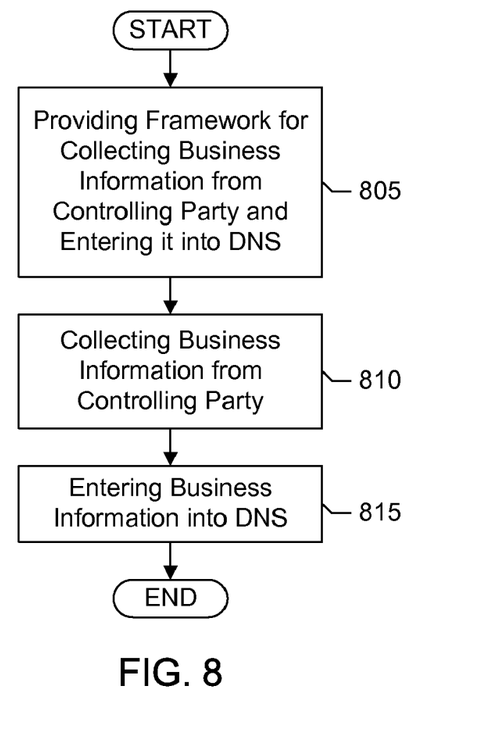
FIG. 8 is a flowchart showing a sample embodiment of a process for collecting Business Information from Controlling Party and entering it into DNS.

Referring to FIG. 8, the Hosting Entity 410 or another entity may provide a framework for collecting the DNS Business Information from the Controlling Party 305 and entering it into the DNS (step 805). The framework may include a website, a webpage, a web service, a web resource, a software, an API (application programming interface), or another technological solution suitable for collecting the DNS Business Information from the Controlling Party 305. The website, webpage, web service, or the web resource may be located at a URL associated with the Controlling Party's domain name, at a URL associated with the Hosting Entity 410, at a URL showing WHOIS information for the domain name, at a URL showing DNS information for the domain name, at a URL showing business registration information for the domain name, etc. The webpage may be a static page, a dynamic page, an active page, or a parked page for the domain name. The framework does not include control panels that are used for entering traditional information into the DNS. The DNS Business Information may be collected from the Controlling Party 305 (step 810) and entered into the DNS (step 815). The DNS Business Information will be typically available for viewing to everyone along with the traditional DNS information.

Figure 9:
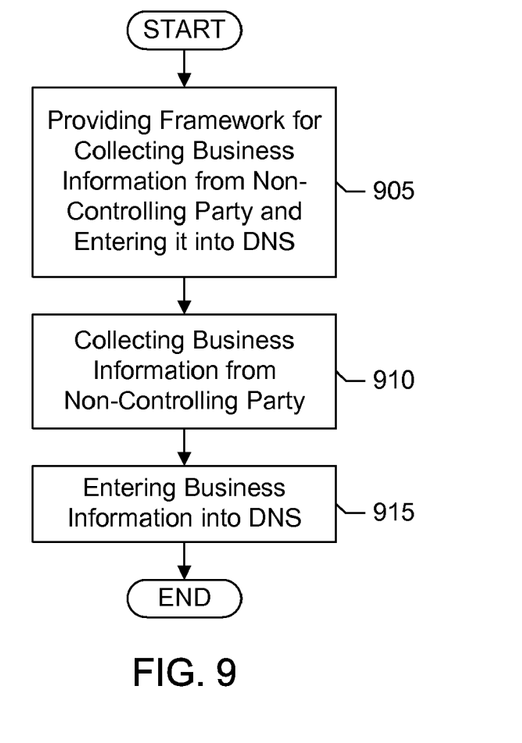
FIG. 9 is a flowchart showing a sample embodiment of a process for collecting Business Information from Non-Controlling Party and entering it into DNS.

Referring to FIG. 9, the Hosting Entity 410 or another entity may provide a framework for collecting the DNS Business Information from the Non-Controlling Party 320 and entering it into the DNS (step 905). The framework may include a website, a webpage, a web service, a web resource, a software, an API (application programming interface), or another technological solution suitable for collecting the DNS Business Information from the Non-Controlling Party 320. The website, webpage, web service, or the web resource may be located at a URL associated with the Controlling Party's domain name, at a URL associated with the Hosting Entity 410, at a URL showing WHOIS information for the domain name, at a URL showing DNS information for the domain name, at a URL showing business registration information for the domain name, etc. The webpage may be a static page, a dynamic page, an active page, or a parked page for the domain name. The framework does not include control panels that are used for entering traditional information into the DNS. The DNS Business Information may be collected from the Non-Controlling Party 320 (step 910) and entered into the DNS (step 915). The DNS Business Information will be typically available for viewing to everyone along with the traditional DNS information.

For example, the Controlling Party 305 may post a comment "This Domain is for sale. Price: $350." (See 1105 in FIG. 11). The Non-Controlling Party 320 may ask "Who should I contact about the purchase of this domain?" (See 1115 in FIG. 11). The DNS Business Information may be saved in TXT field in the DNS records or any other field. The DNS Business Information may be saved in the DNS as text, as character-separated (delimited) text, as fixed width columns text, as markup language formatted text, or in any other form. The markup language formatted text may include HTML, XML, or any other markup language. The Hosting Entity 410 may impose further limitations on which tags can be used in the markup language; e.g. scripts can be prohibited. Additionally a link, an image, a banner, or any other multimedia information may be saved into the DNS. Involved parties may also participate in a link exchange and/or a banner exchange.

Additional information on DNS and its records may be found at Mockapetris, RFC1035, Domain Names—Implementation and Specification, November 1987 and Rosenbaum, RFC1464, Using the Domain Name System To Store Arbitrary String Attributes, May 1993, which are both hereby incorporated in their entirety by reference.

In an alternative embodiment, one or more records posted in WHOIS and DNS may be private, and therefore, available only to the Controlling Party 305 or one or more selected Non-Controlling Parties.

Figure 5:
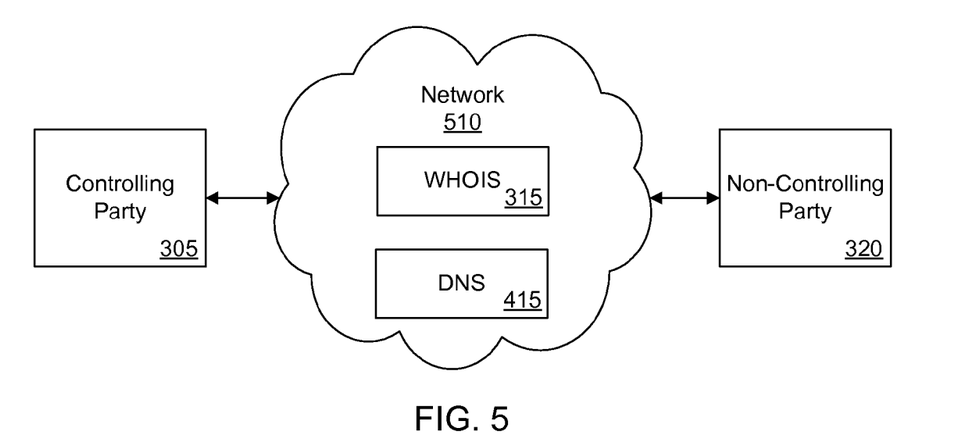
FIG. 5 is a block diagram illustrating a sample embodiment of a system of the present invention.

Referring to FIG. 5, access to the WHOIS 315 and the DNS 415 by the Controlling Party 305 and the Non-Controlling Party 320 is performed via a Network 510, such as the Internet. Often technological means used by the Controlling Party 305 and the Non-Controlling Party 320 to access the WHOIS 315 and the DNS 415 don't connect to the Registering Entity 310 and the Hosting Entity 410 directly, but rather use standardized network protocols for access and data exchange.

Further, the elements from the above described systems may be combined in a single system and the steps from the above described methods may be combined in a single method. The methods described above can be performed manually, partially automated, or fully automated.

The above-described embodiments have been provided by way of example, and the present invention is not limited to these examples. Multiple variations and modification to the disclosed embodiments will occur, to the extent not mutually exclusive, to those skilled in the art upon consideration of the foregoing description. Such variations and modifications, however, fall well within the scope of the present invention as set forth in the following claims.

The Abstract accompanying this specification is provided to enable the United States Patent and Trademark Office and the public generally to determine quickly from a cursory inspection the nature and gist of the technical disclosure and is in no way intended for defining, determining, or limiting the present invention or any of its embodiments.

The invention claimed is:

1. A method, comprising the steps of:
   a) providing a framework for collecting a business information from a party having control over a domain name, wherein said business information does not include information used for technical operation of said domain name nor for resolution of said domain name through a Domain Name System (DNS),
   b) collecting said business information from said party having control over said domain name, and
   c) entering said business information into a resource records of a DNS zone file of said domain name, wherein said DNS zone file is located on a DNS server, wherein said Domain Name System is a distributed computing system configured to translate domain names to IP addresses, thus said distributed computing system is enabling access to resources on the Internet.

2. The method of claim 1, wherein said framework is a website.

3. The method of claim 1, wherein said framework is a webpage.

4. The method of claim 1, wherein said framework is a web service.

5. The method of claim 1, wherein said framework is located at a URL associated with said domain name.

6. The method of claim 1, wherein said framework is a parked page for said domain name.

7. The method of claim 1, wherein said steps a), b) and c) are performed by a Registry.

8. The method of claim 1, wherein said steps a), b) and c) are performed by a Registrar.

9. The method of claim 1, wherein said steps a), b) and c) are performed by a Hosting Provider.

10. The method of claim 1, wherein said business information, at least in part, is an HTML formatted text.

11. The method of claim 1, wherein said business information, at least in part, is an XML formatted text.

12. The method of claim 1, wherein said business information is entered into a TXT resource record of said DNS zone file of said domain name.

13. A method, comprising the steps of:
a) providing a website for collecting a business information in an XML format from a party having control over a domain name, wherein said business information does not include information used for technical operation of said domain name nor for resolution of said domain name through a Domain Name System (DNS),
b) collecting said business information in said XML format from said party having control over said domain name, and
c) entering said business information into a resource records of a DNS zone file of said domain name, wherein said DNS zone file is located on a DNS server, wherein said Domain Name System is a distributed computing system configured to translate domain names to IP addresses, thus said distributed computing system is enabling access to resources on the Internet.

* * * * *